(12) United States Patent
Saha et al.

(10) Patent No.: US 11,116,041 B1
(45) Date of Patent: Sep. 7, 2021

(54) WIRELESS DATA SERVICE CONTROL OVER RADIO BANDS IN A WIRELESS COMMUNICATION NETWORK

(71) Applicant: T-MOBILE INNOVATIONS LLC, Overland Park, KS (US)

(72) Inventors: Sougata Saha, Overland Park, KS (US); Kavitha Swaminathan, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 37 days.

(21) Appl. No.: 16/786,653

(22) Filed: Feb. 10, 2020

(51) Int. Cl.
  *H04W 4/00* (2018.01)
  *H04W 88/10* (2009.01)
  *H04W 76/16* (2018.01)
  *H04W 36/12* (2009.01)
  *H04W 4/029* (2018.01)
  *H04W 36/28* (2009.01)
  *H04W 76/27* (2018.01)

(52) U.S. Cl.
  CPC .......... *H04W 88/10* (2013.01); *H04W 4/029* (2018.02); *H04W 36/12* (2013.01); *H04W 36/28* (2013.01); *H04W 76/16* (2018.02); *H04W 76/27* (2018.02)

(58) Field of Classification Search
  CPC ..... H04W 88/10; H04W 76/16; H04W 36/28; H04W 4/029; H04W 76/27; H04W 36/12

USPC .................................. 370/329; 455/312–316
See application file for complete search history.

(56) References Cited

U.S. PATENT DOCUMENTS

| | | | |
|---|---|---|---|
| 8,320,291 B2 | 11/2012 | Rune et al. | |
| 8,594,023 B2 | 11/2013 | He et al. | |
| 8,830,863 B2 | 9/2014 | Novak et al. | |
| 9,622,132 B2 | 4/2017 | Wang et al. | |
| 10,485,048 B2 | 11/2019 | Zeng et al. | |
| 10,536,824 B2 | 1/2020 | Wang et al. | |
| 2011/0149913 A1 | 6/2011 | Park et al. | |
| 2014/0051443 A1 | 2/2014 | Diachina et al. | |
| 2019/0320322 A1 | 10/2019 | Jayawardene et al. | |
| 2019/0357199 A1* | 11/2019 | Ali ........................ | H04W 48/18 |

FOREIGN PATENT DOCUMENTS

WO    2018064068 A1    4/2018

* cited by examiner

*Primary Examiner* — Marcos Batista

(57) ABSTRACT

A wireless access node exchanges data with User Equipment (UE) over a radio band and determines a performance metric for the UE over the radio band. The wireless access node transfers the performance metric to the UE. The UE translates the performance metric into a service instruction for the radio band and transfers the service instruction to the wireless access node. The wireless access node transfers the service instruction to a network controller. The network controller modifies the wireless data service for the wireless UE over the radio band in response to the service instruction.

20 Claims, 8 Drawing Sheets

WIRELESS DATA SERVICE CONTROL OVER RADIO BANDS IN A WIRELESS COMMUNICATION NETWORK

TECHNICAL BACKGROUND

Wireless communication networks provide wireless data services to wireless user devices. Exemplary wireless data services include internet-access, media-streaming, messaging, and gaming. Exemplary wireless user devices comprise phones, computers, wearable transceivers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN).

The wireless access nodes and the wireless user devices use radio bands of electromagnetic spectrum for their wireless communications. An exemplary radio band might be 200 megahertz wide and located near 2 gigahertz. Some radio bands are licensed from the Federal Communication Commission (FCC) and others are publicly available. Modern wireless user devices are now equipped with multiple radios that communicate over different radio bands, and these multi-band communications may occur simultaneously.

The different wireless data services use different types of wireless connections. The different connections have their own custom Quality-of-Service (QoS). For example, a voice-conferencing service uses a wireless connection that has a low-latency QoS, while an internet-access service uses a wireless connection that has a variable QoS. The QoS specifies metrics for a wireless connection like bit-rate and latency that are tailored for a given data service.

Unfortunately, the wireless communication networks do not efficiently control the complex combinations of radio bands and data services based on QoS. Moreover, the wireless communication networks do not exert radio band control to effectively save user battery life, lower radio interference, and load balance radio bands.

Technical Overview

A wireless access node exchanges data with User Equipment (UE) over a radio band and determines a performance metric for the UE and the radio band. The wireless access node transfers the performance metric to the UE. The UE translates the performance metric into a service instruction for the radio band and transfers the service instruction to the wireless access node. The wireless access node transfers the service instruction to a network controller. The network controller modifies the wireless data service for the wireless UE over the radio band in response to the service instruction.

DETAILED DESCRIPTION

Figure 1:
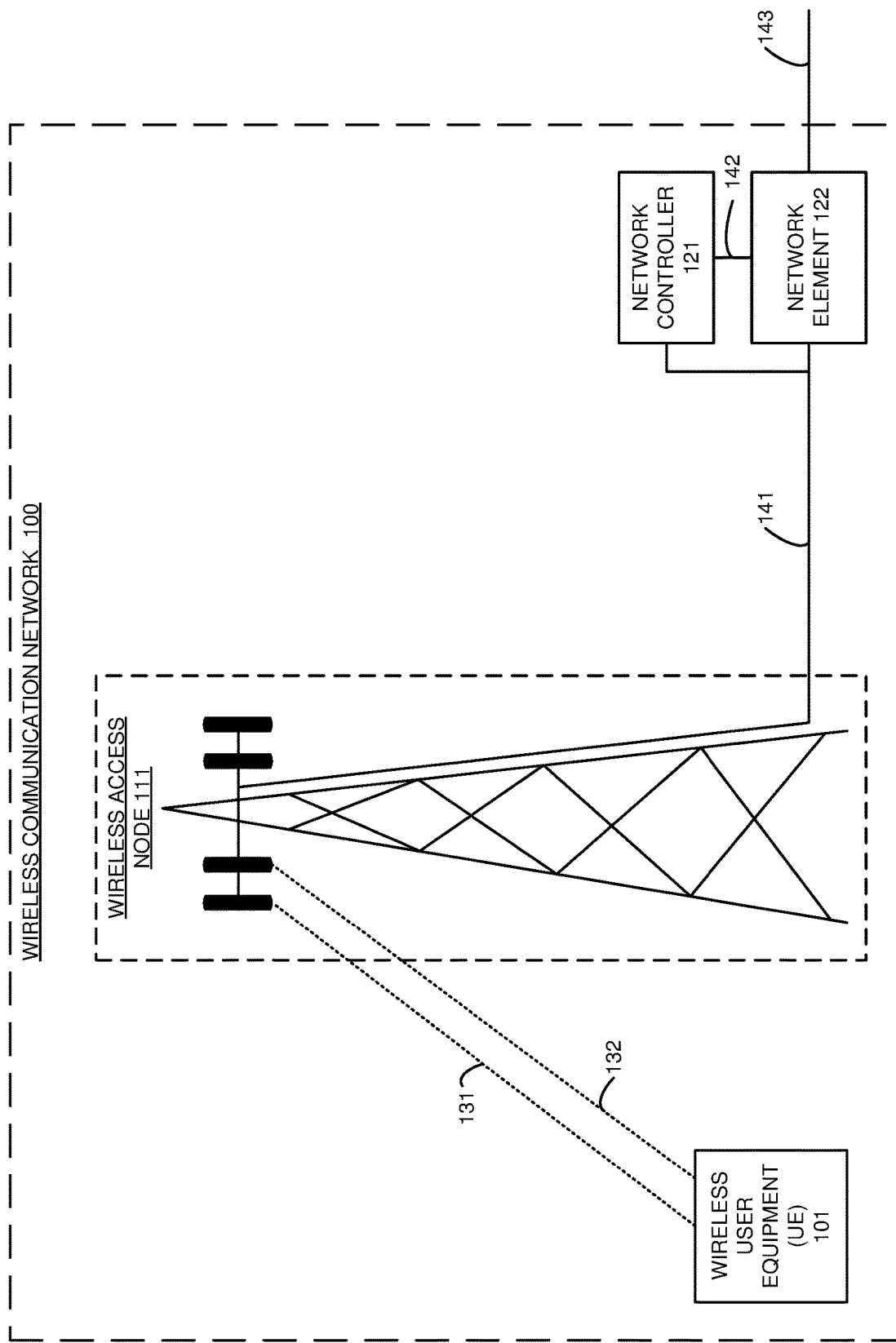
FIG. 1 illustrates a wireless communication network to control wireless data services for wireless User Equipment (UE).

FIG. 1 illustrates wireless communication network 100 to control wireless data services for wireless User Equipment (UE) 101 over one or more radio bands. The wireless data services comprise Internet-access, media-streaming, messaging, gaming, machine-control, and/or some other wireless data product. Wireless communication network 100 comprises UE 101, wireless access node 111, network controller 121, and network element 122. Wireless UE 101 and wireless access node 111 are coupled over wireless communication links 131 and 132. Wireless access node 111 is coupled to network controller 121 and network element 122 over backhaul links 141. Wireless network controller 121 and wireless network element 122 are coupled over network links 142. Wireless network element 122 and external data systems are coupled over data links 143.

Wireless UE 101, wireless links 131-132, and wireless access node 111 may use wireless communication protocols like Fifth Generation New Radio (5GNR), Long Term Evolution (LTE), Low-Power Wide Area Network (LP-WAN), Institute of Electrical and Electronic Engineers (IEEE) 802.11 (WIFI), or some other wireless networking protocol. Wireless links 131-132 use different frequency bands from one another. The frequency bands use frequency blocks in the low-band, mid-band, high-band, or some other part or the wireless electromagnetic spectrum. Data links 141-143 may use Time Division Multiplex (TDM), IEEE 802.3 (ETHERNET), Internet Protocol (IP), Data Over Cable System Interface Specification (DOCSIS), LTE, 5GNR, virtual switching, radio tunneling protocols, or some other data network protocol. Communication links 131-132 and 141-143 may include intermediate network elements. For example, wireless link 131 may include a wireless repeater, and backhaul links 141 may include IP routers.

Wireless UE 101 might be a phone, computer, wearable transceiver, robot, vehicle, or some other data appliance with wireless communication circuitry. Wireless UE 101 comprises radios and user circuitry which are coupled over bus circuitry. The radios comprise antennas, filters, amplifiers, analog-to-digital interfaces, microprocessors, memory, software, transceivers, bus circuitry, and the like. The user circuitry comprises microprocessors, memory, software, transceivers, bus circuitry, and the like. The microprocessors comprise Digital Signal Processors (DSP), Central Processing Units (CPUs), Graphical Processing Units (GPUs), Application-Specific Integrated Circuits (ASICs), and/or the like. The memories comprise Random Access Memory (RAM), flash circuitry, disk drives, and/or the like. The memories store software like operating systems, user applications, and network applications.

Wireless access node 111 comprises radios and Baseband Units (BBUs) which are coupled over bus circuitry. The radios comprise antennas, filters, amplifiers, analog-to-digital interfaces, microprocessors, memory, software, transceivers, bus circuitry, and the like. The BBUs comprise microprocessors, memory, software, transceivers, bus circuitry, and the like. The microprocessors comprise DSP, CPUs, GPUs, ASICs, and/or the like. The memories comprise RAM, flash circuitry, disk drives, and/or the like. The memories store software like operating systems and network applications. In some examples, wireless access node 111 comprises a Fifth Generation New Radio (5GNR) gNodeB and/or a Long Term Evolution (LTE) eNodeB.

Network controller 121 and network element 122 comprise microprocessors, memory, software, and bus interfaces. The microprocessors comprise CPU, GPU, ASIC, and/or the like. The memory comprises RAM, flash circuitry, disk drive, and/or the like. The memory stores software like operating system and network applications. Exemplary network controllers include Access and Mobility Management Functions (AMFs), Session Management Functions (SMFs), Mobility Management Entities (MMEs), and the like. Exemplary network elements include User Plane Functions (UPFs), Serving Gateways (SGWs), Packet Data Network Gateways (PGWs), and the like. In some examples, network controller 121 and/or network element 122 comprise Virtual Network Functions (VNFs) in a Network Function Virtualization Infrastructure (NFVI).

In operation, wireless access node 111 wirelessly exchanges user data with wireless UE 101 over a radio band of wireless link 131 to deliver one or more wireless data services. Each data service uses a wireless bearer that has its own Quality-of-Service (QoS). Wireless access node 111 determines a communication performance metric for wireless UE 101 over the radio band of wireless link 131. The communication metric may comprise data throughput, error rate, path loss, and/or some other radio quality measurement. Data throughput is typically measured in average bytes per second on the downlink and/or uplink. The error rate may be a Hybrid Automatic Repeat Request (HARD) Block Error Rate (BLER). The path loss is typically measured in decibels and represents the difference between transmit power and receive power on the uplink and/or downlink. Wireless access node 111 wirelessly transfers the performance metric to wireless UE 101—possibly in a Radio Resource Control (RRC) reconfiguration message.

In some examples, wireless access node 111 processes a set of performance metrics for a UE 101 and a radio band to generate a performance index for UE 101 over the radio band. For example, wireless access node 111 may normalize, quantize, and sum metrics like data throughput, error rate, and path loss into an integer from 1-20 that represents performance quality. Wireless access node 111 may continuously calculate and transfer the performance index to wireless UE 101 in RRC reconfiguration messages.

Wireless UE 101 wirelessly receives the communication performance metric for UE 101 over the radio band. Wireless UE 101 translates the performance metric for the radio band into a service instruction for the radio band. For example, UE 101 may host a data structure that correlates performance indices into service instructions like stop service, increase throughput, band-switch, and the like. For example, the data structure may restart a service or increase throughput as the radio band performance improves, or the data structure may stop a service or decrease throughput as the radio band performance falls.

Wireless UE 101 wirelessly transfers the service instruction to wireless access node 111. Wireless access node 111 wirelessly receives the service instruction and transfers the service instruction to network controller 121. In some examples, wireless UE 101 transfers a Tracking Area Update (TAU) over wireless access node 111 to network controller 121, and the TAU carries the service instruction to network controller 121.

Network controller 121 receives the service instruction from UE 101 for the radio band—possibly in a TAU. Network controller 121 determines a service modification for the radio band in response to the service instruction. Exemplary service modifications for the radio band comprise disabling or enabling the data service, increasing/decreasing throughput, initiating a band-switch, and the like. The service instruction from UE 101 and the service modification by network controller 121 are often the same, but network controller 121 may determine service modifications that differ from the service instruction. For example, UE 101 may transfer a service instruction to reduce throughput on the radio band, and an AMF may translate the reduced throughput instruction into service modifications to stop the service, switch radio bands, and re-start the service.

Network controller 121 signals network element 122 to modify the wireless data service for the wireless UE per the service modifications. Network controller 121 signals wireless access node 111 and UE 101 to modify the wireless data service per the service modifications. Network element 122, access node 111, and UE 101 modify the data service responsive to the signaling. For example, a gNodeB and UPF may terminate a video conferencing bearer for UE 101 that was using a poorly-performing radio band, while an eNodeB, SGW, and PGW may add a video conferencing bearer for UE 101 that uses an adequately-performing radio band.

Advantageously, wireless communication network 100 efficiently and effectively controls data services for wireless UE 101 based performance metrics to improve overall service quality for UE 101. Moreover, the service control exerted by wireless communication network 100 saves UE battery life, lowers radio interference, load balances radio bands, and initiates band mobility for UEs.

Figure 2:
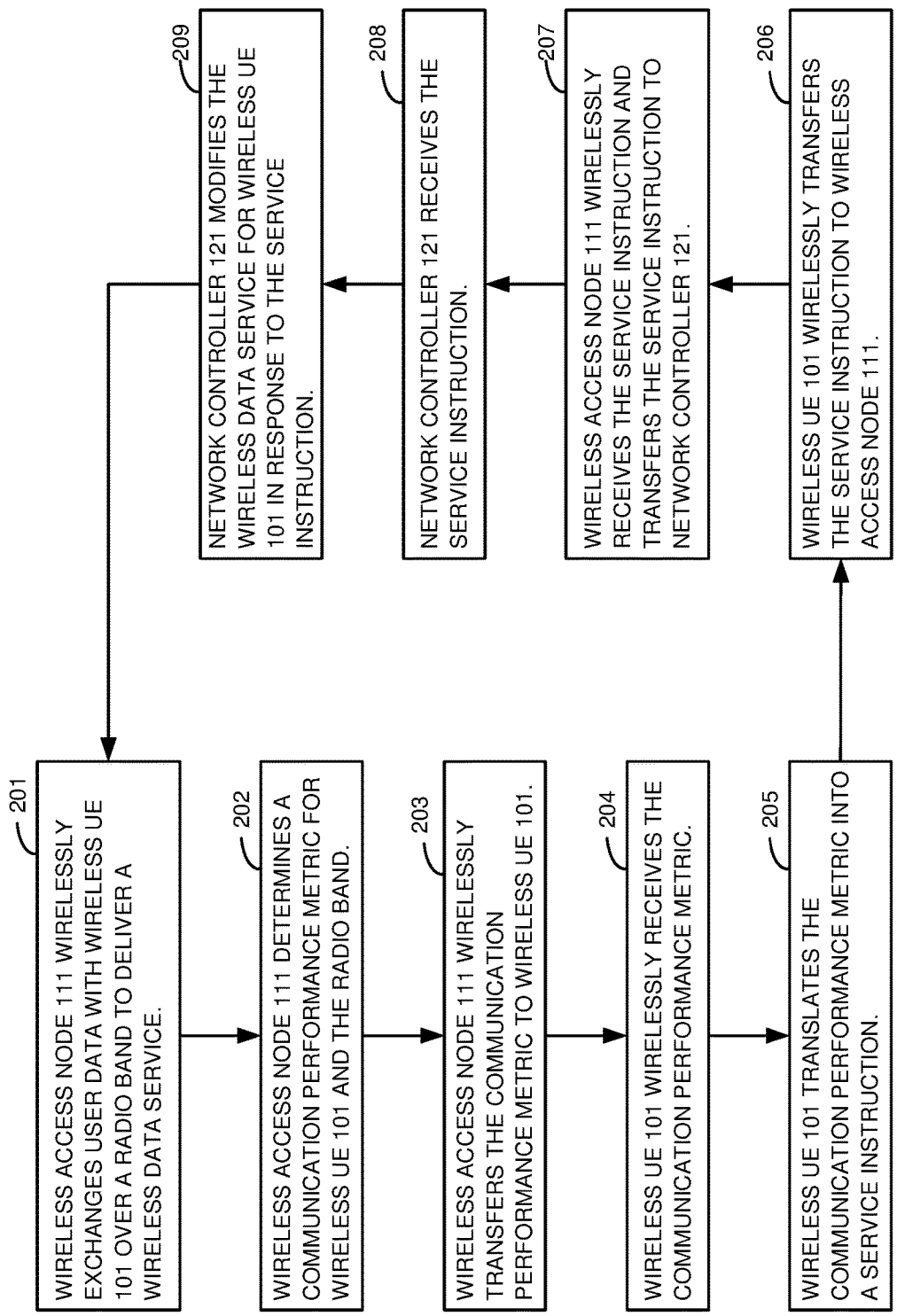
FIG. 2 illustrates the operation of the wireless communication network to control the wireless data services for the wireless UE.

FIG. 2 illustrates the operation of wireless communication network 100 to control the wireless data services for wireless UE 101. Wireless access node 111 wirelessly exchanges user data with wireless UE 101 over a radio band in wireless link 131 to deliver a wireless data service (201). Wireless access node 111 determines a communication performance metric for wireless UE 101 and the radio band (202). The communication performance metric may comprise an index that is calculated based on other metrics. Wireless access node 111 wirelessly transfers the communication performance metric to wireless UE 101 (203)—possibly in an RRC reconfiguration message.

Wireless UE 101 wirelessly receives the communication performance metric (204)—possibly in the RRC reconfiguration message. Wireless UE 101 translates the communication performance metric into a service instruction (205). UE 101 may translate a numeric performance index into a service instruction like stop data service over band, decrease secondary component carriers over band, and the like. Wireless UE 101 wirelessly transfers the service instruction to wireless access node 111 (206)—possibly in a TAU. Wireless access node 111 wirelessly receives the service instruction and transfers the service instruction to network controller 121 (207). Network controller 121 receives the service instruction for the radio band (208)—possibly in the TAU. Network controller 121 modifies the wireless data service for wireless UE 101 in response to the service instruction from UE 101 (209). For example, an MME may signal an LTE eNodeB to decrease the secondary component carriers for UE 101 on the radio band and may signal an SGW to reduce throughput for wireless UE 101 over the backhaul link. The process repeats (201).

Figure 3:
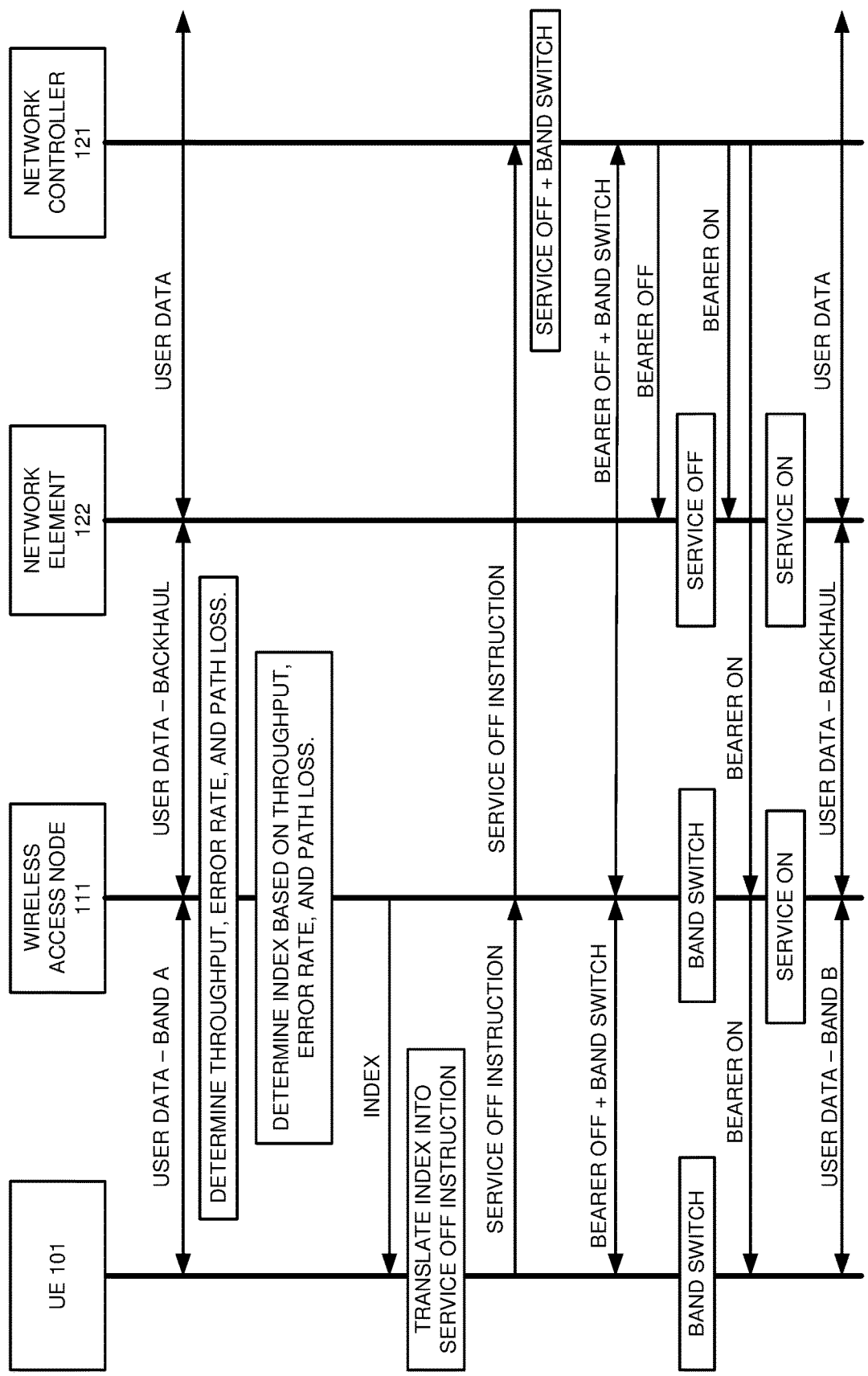
FIG. 3 illustrates the operation of the wireless communication network to control the wireless data services for the wireless UE.

FIG. 3 illustrates the operation of the wireless communication network 100 to control the wireless data services for wireless UE 101. Wireless access node 111 wirelessly exchanges user data with wireless UE 101 over radio band A of wireless link 131 to deliver a wireless data service. Wireless access node 111 and network element 122 exchange the user data to deliver the wireless data service. Network element 122 exchanges the user data with other data systems to deliver the wireless data service. Wireless access node 111 determines communication performance metrics like data throughput, error rate, and path loss for wireless UE 101 and radio band A. In this example, wireless access node 111 determines an index based on the communication performance metrics, although an index is not required in other examples. To determine the index for the radio band, wireless access node 111 multiplies each performance metric (throughput, error rate, path loss) by a normalizing factor, quantizes the normalized metrics into integers, and sums the integers into the index which falls in a range from 1-20. Wireless access node 111 wirelessly transfers the communication performance index for the radio band to wireless UE 101—possibly in an RRC reconfiguration message.

Wireless UE 101 wirelessly receives the communication performance index—possibly in the RRC reconfiguration message. Wireless UE 101 translates the communication performance index into a service instruction. Some performance indices may cause service termination or resource reductions while other performance indices may cause service restoration or resource increases. In this example, the service instruction is to turn off the data service on the radio band. Wireless UE 101 wirelessly transfers the "service off" instruction for the radio band to wireless access node 111—possibly in a TAU. Wireless access node 111 transfers the service off instruction to network controller 121. Network controller 121 receives the service off instruction for the radio band—possibly in the TAU.

In this example, network controller 121 terminates a wireless data service for wireless UE 101 over the radio band and initiates a band switch for the service to another radio band in response to the service instruction. Network controller 121 may take different actions in other examples. In this example, network controller 121 compares average performance metrics for bands A and B (average load, average throughput, average path loss) to determine that band B has better average quality than band A and to initiate a band switch for UE 101 from band A to band B in response to the service instruction from UE 101. Network controller 121 signals UE 101 and wireless access node 111 to terminate the data bearer for the service over the radio band and perform a band switch for band A to band B for the service. Network controller 121 signals network element 122 to terminate the data bearer for the service for UE 101 and to add a different data bearer that uses band B for the service.

As a result of the signaling, the data service is terminated on a poorly performing radio band to save UE battery life and to reduce radio interference on the band. By moving services from bad radio bands to good radio bands, network controller 121 effectively load-balances the services across the radio bands.

UE 101 and wireless access node 111 perform the band switch from radio band A to radio band B. After the band switch, network controller 121 signals UE 101, wireless access node 111, and network element 122 to restart the data service with a new bearer over the radio band B. Wireless access node 111 wirelessly exchanges user data with wireless UE 101 over radio band B in wireless link 132 to deliver the wireless data service. Wireless access node 111 and network element 122 exchange the user data to deliver the wireless data service. Network element 122 exchanges the user data with other data systems to deliver the wireless data service.

Figure 4:
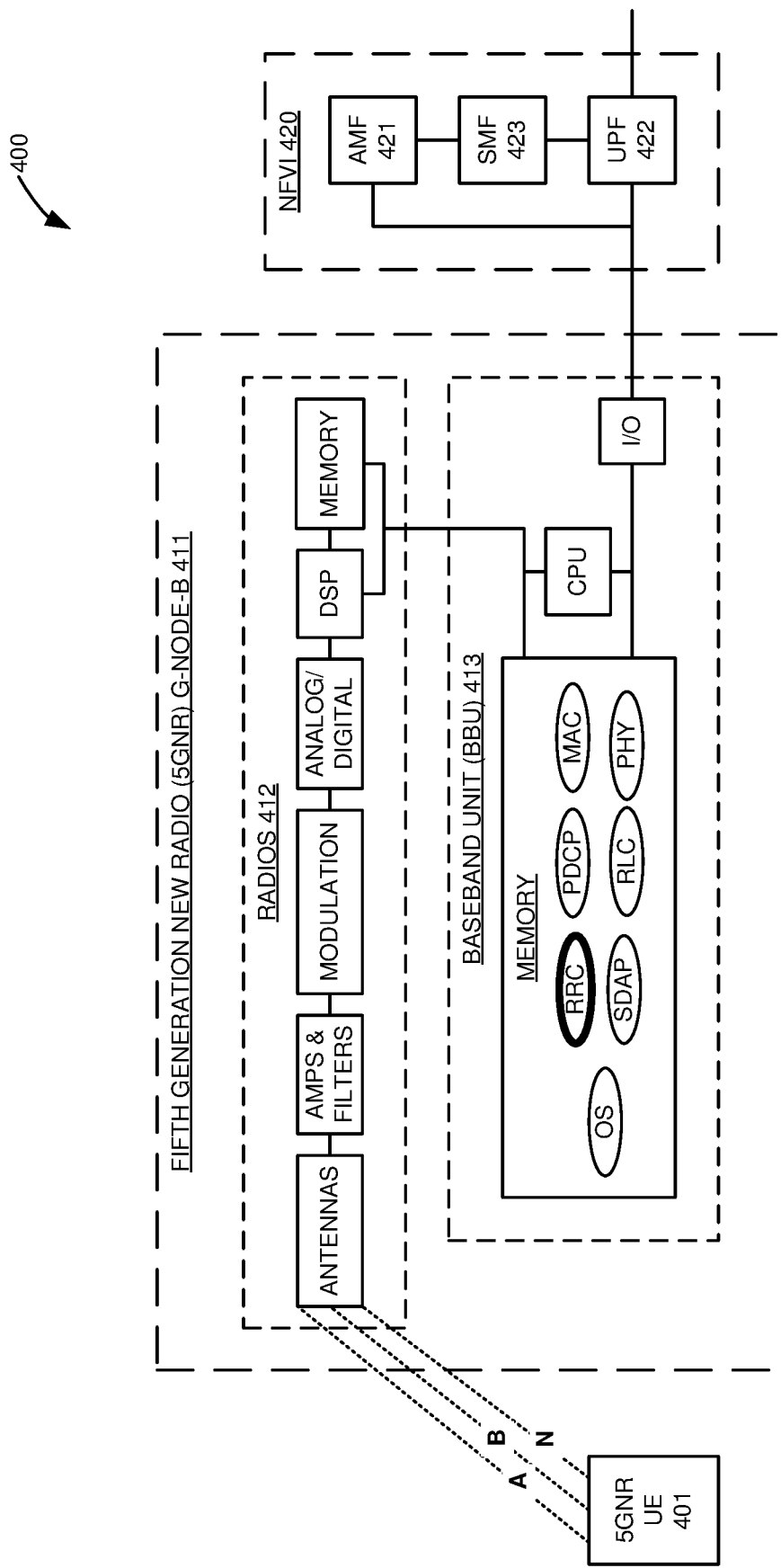
FIG. 4 illustrates a Fifth Generation New Radio (5GNR) gNodeB to control wireless data services for a 5GNR UE over multiple radio bands.

FIG. 4 illustrates Fifth Generation New Radio (5GNR) gNodeB 411 to control wireless data services for 5GNR UE 401 over multiple radio bands A-N in wireless communication network 400. 5GNR gNodeB 411 is an example of wireless access node 111, although wireless access node 111 may differ. 5GNR gNodeB 411 comprises radios 412 and Baseband Unit (BBU) 413. Radios 412 comprise antennas, amplifiers, filters, modulation, analog-to-digital interfaces, Digital Signal Processors (DSP), and memory that are coupled over bus circuitry. BBU 413 comprises memory, Central Processing Units (CPU), and data Input/Output (I/O) that are coupled over bus circuitry. 5GNR UE 401 is wirelessly coupled to the antennas in radios 412 over multiple 5GNR radio bands A-N. Radios 412 and BBU 413 are coupled over data links like Common Public Radio Interface (CPRI). The BBU I/O is coupled over backhaul links to AMF 421, UPF 422, and SMF 423 which are resident in Network Function Virtualization Infrastructure (NFVI) 420. The BBU memory stores an operating system (OS), Physical Layers (PHY), Media Access Controls (MAC), Radio Link Controls (RLC), Packet Data Convergence Protocols (PDCP), Radio Resource Controls (RRC) and Service Data Adaptation Protocols (SDAP). The CPU executes the PHY, MAC, RLC, PDCP, RRC, and SDAP to drive the exchange of user data and network signaling between radios 412 and NFVI 420.

In radios 412, the antennas receive wireless 5GNR signals from 5G UEs 401 over radio bands A-N. The 5GNR signals transport Uplink (UL) 5GNR signaling and UL 5GNR data. The antennas transfer corresponding electrical UL signals through duplexers to the amplifiers. The amplifiers boost the received UL signals for filters which attenuate unwanted energy. In modulation, demodulators down-convert the UL signals from the carrier frequencies for bands A-N. The analog/digital interfaces convert the analog UL signals into digital UL signals for the DSP. The DSP recovers UL 5GNR symbols from the UL digital signals. In BBU 413, the CPU executes the network applications to process the UL 5GNR symbols and recover the UL 5GNR signaling and UL 5GNR data. The CPU executes the RRC to process the UL 5GNR signaling and Downlink (DL) 5GNR signaling to generate new UL 5GNR signaling and new DL 5GNR signaling. The RRC transfers the new UL 5GNR signaling to AMF 421 in NFVI 420 over the data I/O and backhaul links. The SDAP transfers the UL 5GNR data to UPF 422 over the data I/O and backhaul links.

In BBU 413, the data I/O receives the DL 5GNR signaling from AMF 421 over the backhaul links. The data I/O receives DL 5GNR data from UPF 422 over the backhaul links. The CPU executes the network applications to process the DL 5GNR signaling and the DL 5GNR data to generate corresponding DL 5GNR symbols that represent the DL 5GNR signaling and DL 5GNR data in the frequency domain. In radios 412, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to the carrier frequencies for bands A-N. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL 5GNR signaling and DL 5GNR data to 5GNR UE 401 over radio bands A-N.

RRC functions comprise authentication, security, handover control, status reporting, Quality-of-Service (QoS), network broadcasts and pages, and network selection. SDAP functions comprise QoS marking and flow control. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

5GNR gNodeB 411 wirelessly exchanges user data with 5GNR UE 401 over radio bands A-N to deliver a wireless data service like internet-access, machine-control, social networking, or the like. In BBU 413, the RRC determines data throughput, error rate, and path for individual radio bands A-N. The RRC calculates a performance index based on the data throughput, error rate, and path loss metrics. The calculation entails normalizing and combining data throughput, error rate, and path loss to form an integer in a range from 1-20. The RRC transfers the performance index to wireless UE 401 in an RRC reconfiguration message. The RRC subsequently receives a Tracking Area Update (TAU) with one or more service instructions for one or more radio bands from 5GNR UE 401. The RRC transfers the TAU that has the service instruction to AMF 421. Subsequently, the RRC receives service modification instructions from AMF 421 like N2 signaling to terminate an interactive-gaming bearer for 5GNR UE 401 that uses radio band A and instruct 5GNR UE 401 to switch from radio band A to radio band B and re-establish the gaming bearer over band B. The RRC implements the service instructions from AMF 421.

Figure 5:
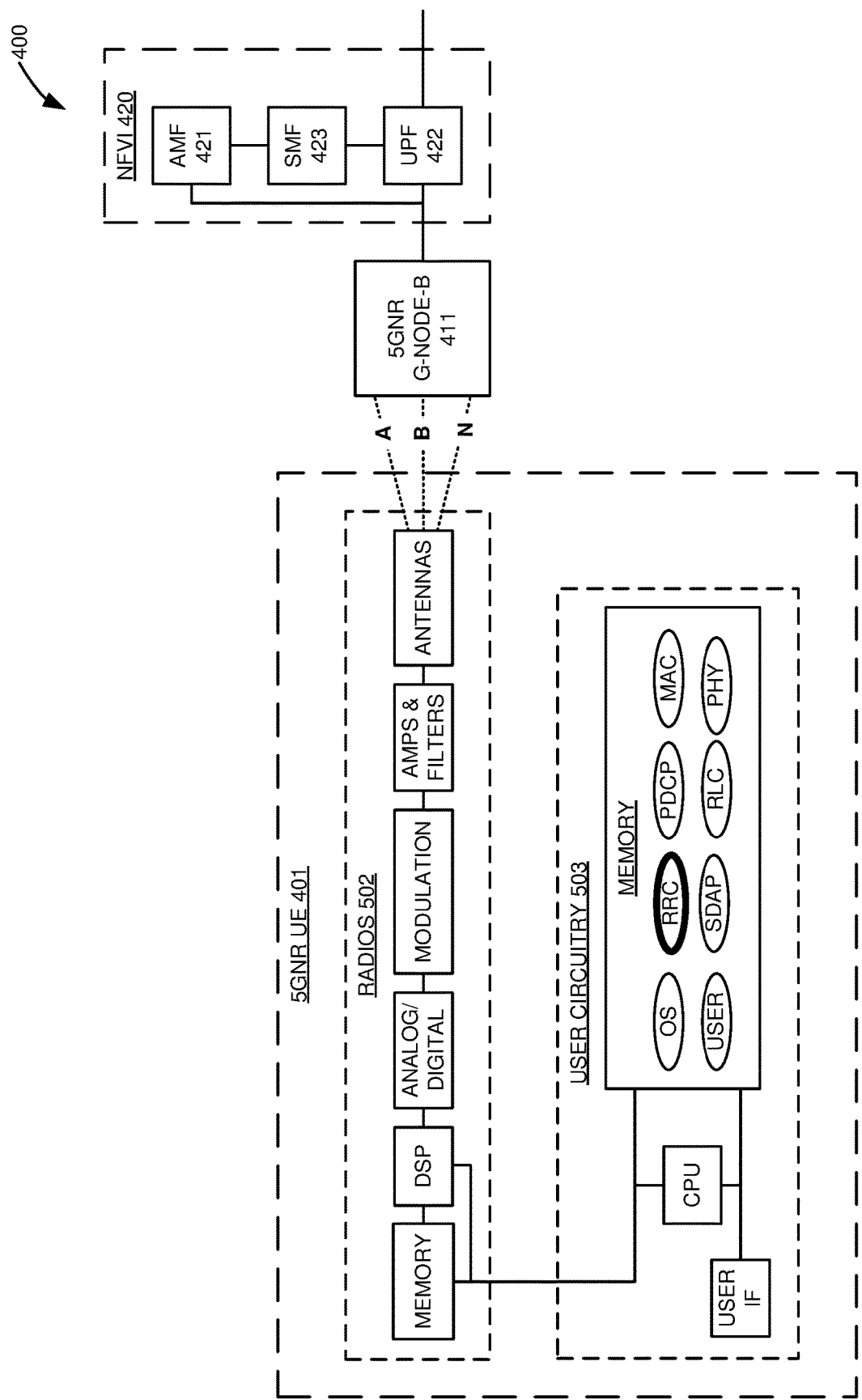
FIG. 5 illustrates a 5GNR UE that controls its wireless data services over multiple radio bands.

FIG. 5 illustrates 5GNR UE 401 that controls its wireless data services over radio bands A-N in wireless communication network 400. 5GNR UE 401 is an example of wireless UE 101, although UE 101 may differ. 5GNR UE 401 comprises radios 502 and user circuitry 503 which are interconnected over bus circuitry. Radios 502 comprise antennas, amplifiers, filters, modulation, analog-to-digital interfaces, DSP, and memory that are coupled over bus circuitry. The antennas in 5GNR UE 401 are wirelessly coupled to 5GNR gNodeB 411 over radio bands A-N. User circuitry 503 comprises data I/O, CPU, and memory. The BBU memory stores an operating system, user applications, and network applications for PHY, MAC, RLC, PDCP, RRC, and SDAP. The CPU executes the operating system and network applications to exchange 5GNR signaling and 5GNR data with 5GNR. The CPU executes the operating system, user applications, and network applications to exchange user signaling and user data between the user applications and the 5GNR RRC and SDAP. The CPU executes the operating system and network applications to wirelessly exchange corresponding 5GNR signaling and 5GNR data with 5GNR gNodeB 411 over radio bands A-N.

In radios 502, the antennas receive wireless 5GNR signals from 5GNR gNodeB 411 that transport DL 5GNR signaling and DL 5GNR data. The antennas transfer corresponding electrical DL signals through duplexers to the amplifiers. The amplifiers boost the received DL signals for filters which attenuate unwanted energy. In modulation, demodulators down-convert the DL signals from the carrier frequencies for radio bands A-N. The analog/digital interfaces convert the analog DL signals into digital DL signals for the DSP. The DSP recovers DL 5GNR symbols from the DL digital signals. The CPU executes the network applications to process the DL 5GNR symbols and recover the DL 5GNR signaling and DL 5GNR data. The RRC transfers corresponding DL user signaling to the operating system/user applications. The SDAP transfers corresponding DL user data to the operating system/user applications.

The SDAP also receives UL user data from the operating system/user applications. The RRC receives UL user signaling from the operating system/user applications. The RRC processes the UL user signaling and the DL 5GNR signaling to generate new DL user signaling and new UL 5GNR signaling. The SDAP interworks between UL user data and UL 5GNR data. The network applications process the UL 5GNR signaling and the UL 5GNR data to generate corresponding UL 5GNR symbols. In radios 502, the DSP processes the UL 5GNR symbols to generate corresponding digital signals for the analog-to-digital interfaces. The analog-to-digital interfaces convert the digital UL signals into analog UL signals for modulation. Modulation up-converts the UL signals to the carrier frequencies for radio bands A-N. The amplifiers boost the modulated UL signals for the filters which attenuate unwanted out-of-band energy. The filters transfer the filtered UL signals through duplexers to the antennas. The electrical UL signals drive the antennas to emit corresponding wireless 5GNR signals that transport the UL 5GNR signaling and UL 5GNR data to 5GNR gNodeB 411.

5GNR UE 401 wirelessly exchanges 5GNR data with 5GNR gNodeB 411 over radio bands A-N to deliver a wireless data service like internet-access, machine-control, social networking, or the like. In 5GNR UE 401, the RRC receives an RRC reconfiguration message from 5GNR gNodeB 411 that indicates a performance index for radio bands 1-N where the index is a normalized combination of data throughput, error rate, and path loss. The RRC translates the performance index into a service instruction. For example, the RRC may host a data structure that correlates the performance indices from 1-20 into service instructions like pause service, stop service, start service, increase throughput, decrease jitter, band switch, and the like. The RRC in 5GNR UE 401 transfers the service instruction to 5GNR gNodeB 411 in a Tracking Area Update (TAU), and gNodeB 411 transfers the TAU and service instruction to AMF 421. Subsequently, the RRC receives N1/N2 signaling from 5GNR gNodeB 411 and AMF 422 that indicate one or more service modifications like instructions to terminate the data bearer for the data service over radio band A and switch from radio band A to radio band B. The RRC in UE 401 implements the service instructions from gNodeB 411 and AMF 421.

Figure 6:
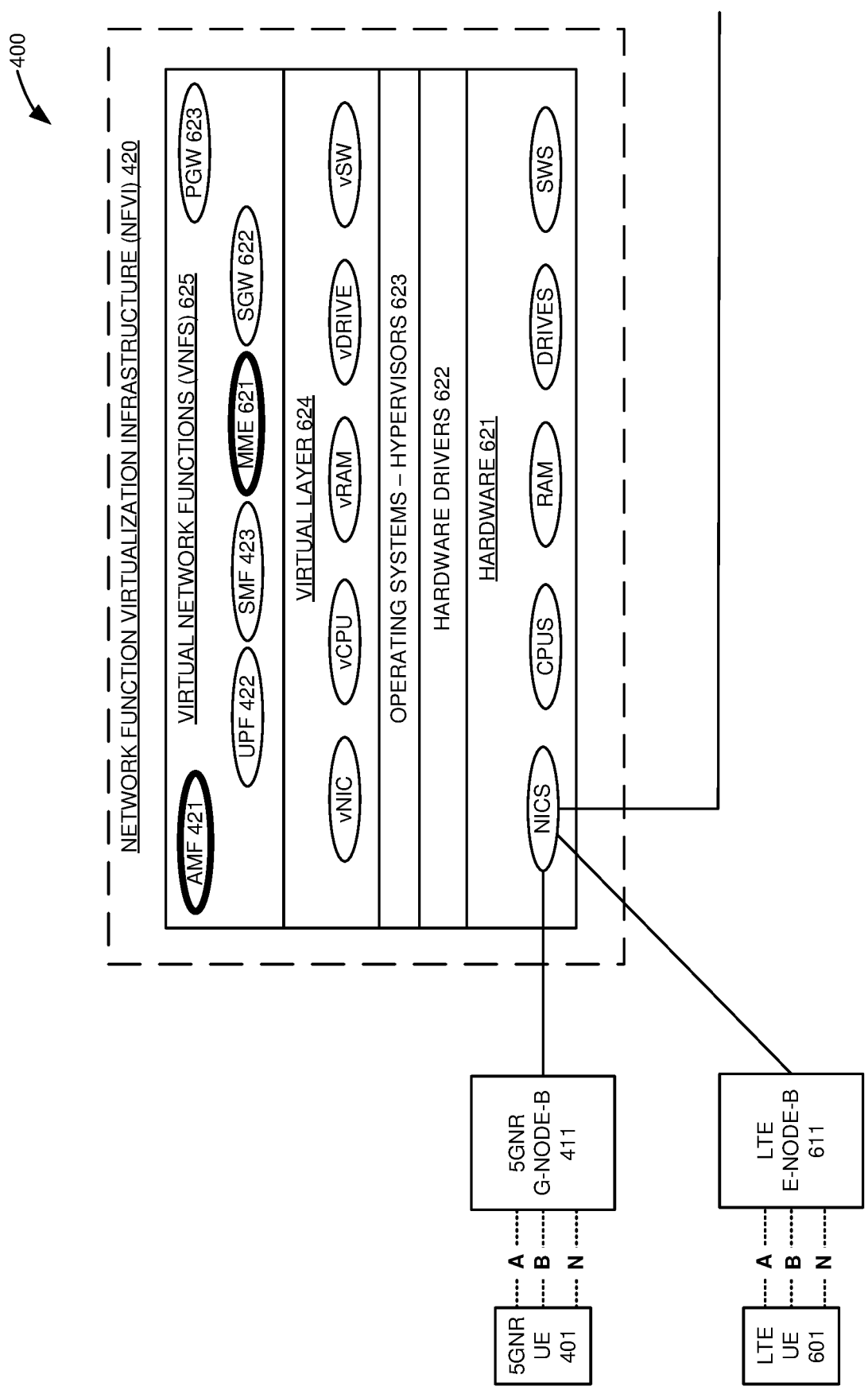
FIG. 6 illustrates a Network Function Virtualization Infrastructure (NFVI) to control wireless data services for a 5GNR UE and a Long Term Evolution (LTE) UE over multiple radio bands.

FIG. 6 illustrates a Network Function Virtualization Infrastructure (NFVI) 420 to control wireless data services for 5GNR UE 401 and Long Term Evolution (LTE) UE 601 over multiple radio bands A-N in wireless communication network 400. NFVI 420 is an example of network controller 121 and network element 122, although networks controller 121 and element 122 may differ. NFVI 420 comprises hardware 621, hardware drivers 622, operating systems and hypervisors 623, virtual layer 624, and Virtual Network Functions (VNFs) 625. Hardware 621 comprises Network Interface Cards (NICs), CPUs, RAM, flash/disk drives, and data switches (SWS). Virtual layer 624 comprises virtual NICs (vNIC), virtual CPUs (vCPU), virtual RAM (vRAM), virtual Drives (vDRIVE), and virtual Switches (vSW). The NICs in NFVI 420 are coupled to 5GNR gNodeB 411 and Long Term Evolution (LTE) eNodeB 611 over backhaul links. VNFs 425 comprise Access and Mobility Management Function (AMF 421), Session Management Function (SMF) 422, User Plane Function (UPF) 423, Mobility Management Entity (MME) 621, Serving Gateway (SGW) 622, Packet Data Network Gateway (PGW) 623. Other network functions are typically present but are omitted for clarity. Hardware 621 executes hardware drivers 622, operating systems and hypervisors 623, virtual layer 624, and VNFs 625 to serve 5GNR UE 401 and LTE UE 601 with data services over radio bands A-N.

AMF 421 receives TAUs from 5GNR gNodeB 411 that include service instructions for radio bands A-N that were issued by 5GNR UE 401 based on performance indices from 5GNR gNodeB 411. AMF 421 determines service modifications for radio bands A-N in response to the service instruction. Exemplary service modifications comprise disabling or enabling the data service, increasing/decreasing throughput, initiating a band-switch, and the like. AMF 421 signals SMF 423 to modify the wireless data service for 5GNR UE 401 per the service modifications. SMF 423 signals UPF 422 to modify the wireless data service for 5GNR UE 401. UPF 422 modifies the data service for UE 401 responsive to the signaling—typically by terminating a data bearer for the service that uses the radio band. AMF 421 also signals gNodeB 411 and UE 402 to modify the wireless data service for 5GNR UE 401.

Figure 7:
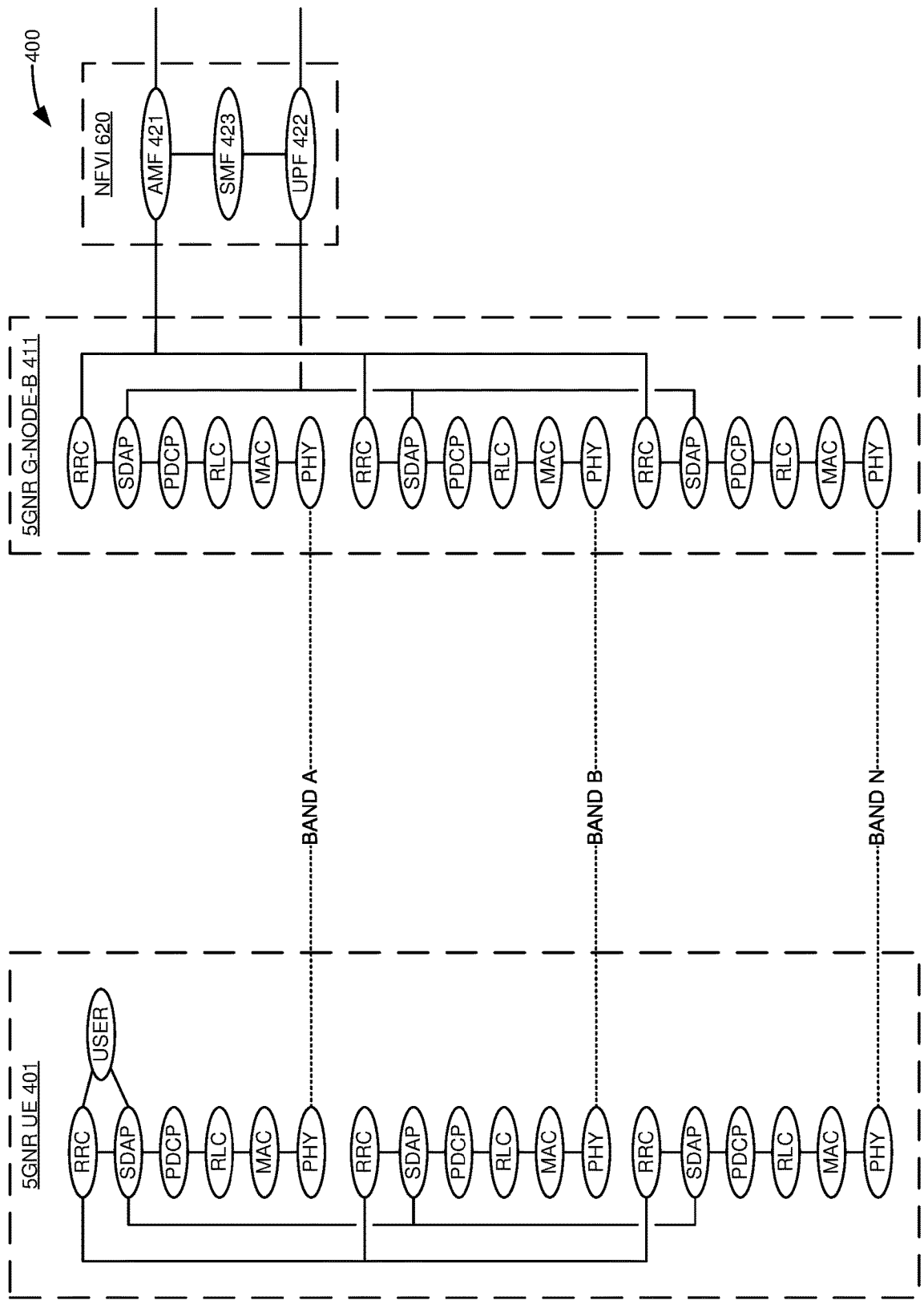
FIG. 7 illustrates the operation of the 5GNR UE, 5GNR access node, and NFVI to control the wireless data services for the 5GNR UE over multiple radio bands.

FIG. 7 illustrates the operation of 5GNR UE 401, 5GNR gNodeB 411, and NFVI 420 to control the wireless data services for 5GNR UE 401 over multiple radio bands A-N in wireless communication network 400. In 5GNR UE 401, the user applications exchange signaling and data with the RRCs and SDAPs for radio bands A-N. The RRCs and SDAPs in UE 401 exchange corresponding signaling and data with the RRCs and SDAPs in 5GNR gNodeB 411 over their PDCPs, RLCs, MACs, PHYs, and radio bands A-N. The RRCs and SDAPs in 5GNR gNodeB 411 exchange corresponding signaling and data with AMF 421 and UPF 422 over the backhaul links.

In 5GNR gNodeB 411, the RRCs determine average data throughput, average error rate, and average path loss for individual radio bands A-N. The RRCs for bands A-N then calculate performance indices for individual radio bands A-N based on the performance averages for the radio band. The RRCs in gNodeB 411 transfer their performance indices to the RRCs in wireless UE 401 in RRC reconfiguration messages over the PDCPs, RLCs, MACs, PHYs, and bands A-N.

In 5GNR UE 401, the RRCs receive the RRC reconfiguration messages from 5GNR gNodeB 411 that indicate the performance indices for radio bands A-N. The RRCs translate the performance indices for the individual radio bands into service instructions for the individual radio bands. For example, the RRC for band A may translate a poor performance index for band A into a service instruction like stop video chat on band A. The RRCs for bands B-N may translate adequate performance indices for bands B-N into a "status normal" instruction or no instruction at all. The RRC for band A in 5GNR UE 401 transfers the service instruction to the RRC in 5GNR gNodeB 411 in a TAU, and gNodeB 411 transfers the TAU and service instruction to AMF 421.

AMF 421 receives the service instruction from the RRC in 5GNR UE 401 in the TAU. AMF 421 processes the service instruction from UE 401 to determine service modifications for UE 491 over radio bands A-N. AMF 421 signals SMF 423 with the service modifications. SMF 423 signals the service modifications to UPF 422, and UPF 422 implements the service modifications. For example, UPF may terminate a video chat bearer for UE 401 that uses band A. UPF 622 may still support other bearers for other services on radio band A. UPF 622 may still supports bearers for services (including video chat) on the other radio bands B-N. AMF 421 may determine a band switch for a data service for 5GNR UE 401.

The RRC for radio band A in 5GNR gNodeB receives N2/N1 signaling that indicates instructions from AMF 421 like terminate a data bearer for 5GNR UE 401 that serves radio band A. The RRC for radio band A signals its SDAP, PDCP, RLC, MAC, and PHY for radio band A to implement the instructions like terminating the data bearer. The RRC for radio band A in 5GNR gNodeB 411 signals the RRC for radio band A in 5GNR UE 401 to implement the service instructions from AMF 421. In UE 401, the RRC for radio band A signals its SDAP, PDCP, RLC, MAC, and PHY to implement the instructions like terminating the data bearer and performing a band switch.

Figure 8:
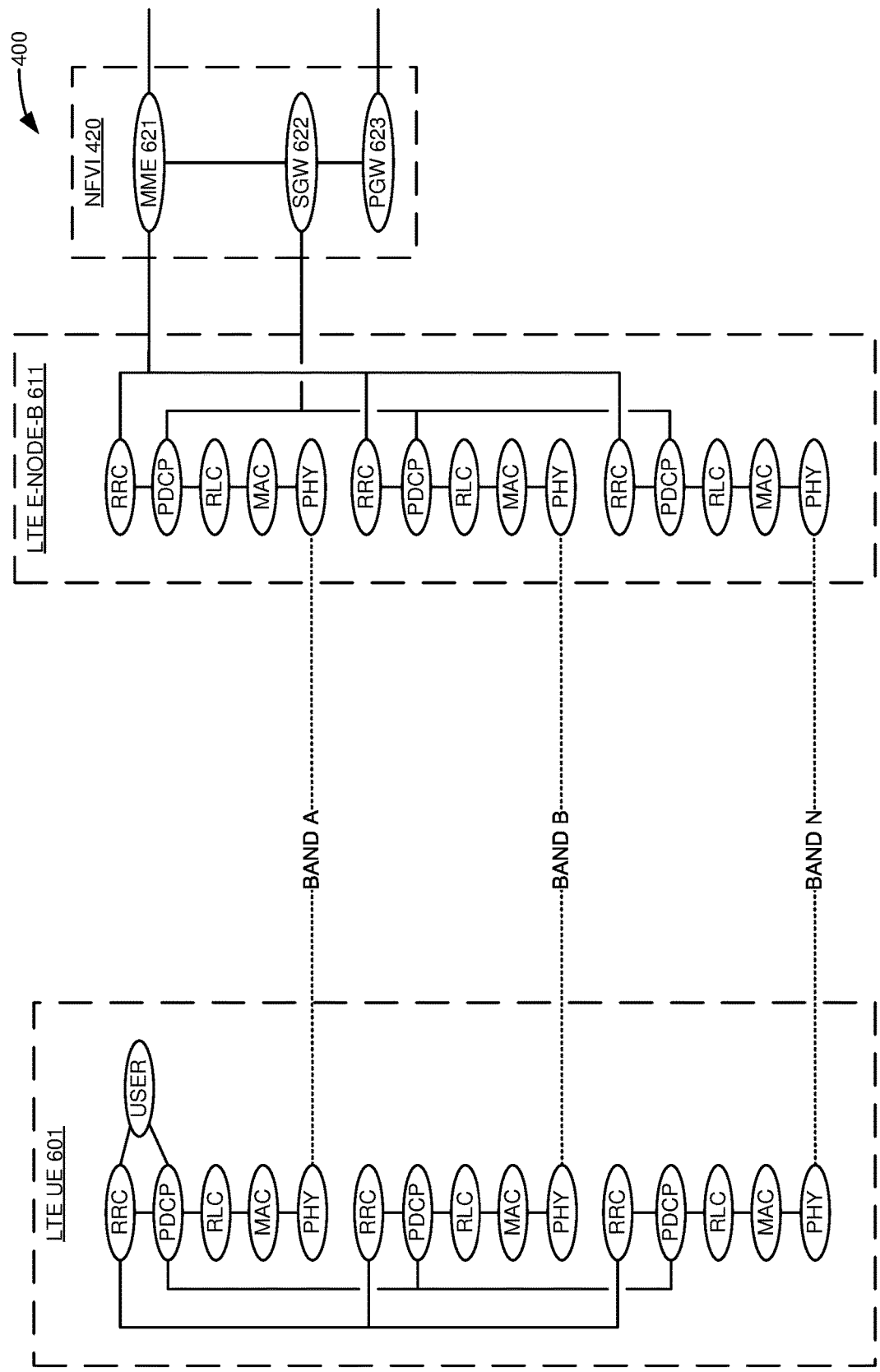
FIG. 8 illustrates the operation of the LTE UE, LTE access node, and NFVI to control wireless data services for the LTE UE over multiple radio bands.

FIG. 8 illustrates the operation of Long Term Evolution (LTE) UE 601, LTE access node 611, and NFVI 420 to control wireless data services for LTE UE 601 over multiple radio bands A-N in wireless communication network 400. In LTE UE 601, the user applications exchange signaling and data with the RRCs and PDCPs for radio bands A-N. The RRCs and PDCPs in UE 601 exchange corresponding signaling and data with the RRCs and PDCPs in LTE eNodeB 611 over their RLCs, MACs, PHYs, and radio bands A-N. The RRCs and PDCPs in LTE eNodeB 611 exchange corresponding signaling and data with MME 621 and SGW 622 over the backhaul links.

In LTE eNodeB 611, the RRCs determine average data throughput, average error rate, and average path loss for radio bands A-N. The RRCs for bands A-N then calculate performance indices for radio bands A-N based on the performance averages for the radio band. The RRCs in eNodeB 611 transfer their performance indices to the RRCs in LTE UE 601 in RRC reconfiguration messages over the PDCPs, RLCs, MACs, PHYs, and bands A-N.

In LTE UE 601, the RRCs receive the RRC reconfiguration messages from LTE eNodeB 611 that indicate the performance indices for radio bands A-N. The RRCs translate the performance indices for the individual bands into service instructions for the individual radio bands. For example, the RRC for band B may translate a poor performance index for band B into a service instruction like stop voice calling on band B. The RRC for band N may translate adequate performance indices for band N into a "status normal" instruction or no instruction at all. The RRC for band A in LTE UE 601 transfers the service instruction to LTE eNodeB 611 in a TAU, and eNodeB 611 transfers the TAU and service instruction to MME 621.

MME 621 receives the service instruction from the RRC in LTE UE 601 in the TAU. MME 621 determines service modifications for radio bands 1-N based on the service instructions from LTE UE 601. MME 621 signals the service modifications to SGW 622 which signals PGW 623. SGW 622 and PGW 623 implement the service modifications. For example, SGW 622 and PGW 623 may terminate voice calling bearers for LTE UE 601 that use band B. SGW 622 and PGW 623 may still support other bearers for other services on radio band B. SGW 622 and PGW 623 may still support bearers for services (including voice calling) on the other radio bands.

The RRC for radio band B in LTE eNodeB 611 receives S1-MME signaling that indicates instructions from MME 621 like terminate a data bearer for LTE UE 601 that uses radio band B. The RRC for radio band B signals its PDCP, RLC, MAC, and PHY for radio band B to implement the instructions like terminating a data bearer. The RRC for radio band B in LTE eNodeB 611 signals the RRC for radio band B in LTE UE 601 to implement the service instructions from MME 621. In UE 601, the RRC for radio band B signals its PDCP, RLC, MAC, and PHY to implement the instructions like terminating the data bearer on band B and performing a band switch to band N.

The wireless data network circuitry described above comprises computer hardware and software that form special-purpose network circuitry to control the quality of wireless data services for wireless UEs that are delivered over multiple radio bands. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to control the quality of wireless data services for wireless UEs that are delivered over multiple radio bands.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to control a wireless data service for a wireless User Equipment (UE), the method comprising:
   a wireless access node wirelessly exchanging user data with the wireless UE over a radio band to deliver the wireless data service;
   the wireless access node determining a communication performance metric for the wireless UE over the radio band and wirelessly transferring the communication performance metric to the wireless UE;
   the wireless UE wirelessly receiving the communication performance metric, translating the communication performance metric into a service instruction for the radio band, and wirelessly transferring the service instruction to the wireless access node;
   the wireless access node wirelessly receiving the service instruction and transferring the service instruction to a network controller; and
   the network controller receiving the service instruction and modifying the wireless data service for the wireless UE over the radio band in response to the service instruction.

2. The method of claim 1 wherein:
   the wireless access node determining the communication performance metric comprises determining a wireless data throughput for the wireless UE and determining an index based on the wireless data throughput; and
   the wireless UE translating the communication performance metric into the service instruction comprises translating the index into the service instruction.

3. The method of claim 1 wherein:
   the wireless access node determining the communication performance metric comprises determining a wireless data throughput and an error rate and for the wireless UE and determining an index based on the wireless data throughput and the error rate; and
   the wireless UE translating the communication performance metric into the service instruction comprises translating the index into the service instruction.

4. The method of claim 1 wherein:
   the wireless access node determining the communication performance metric comprises determining a wireless data throughput and a path loss and for the wireless UE and determining an index based on the wireless data throughput and the path loss; and
   the wireless UE translating the communication performance metric into the service instruction comprises translating the index into the service instruction.

5. The method of claim 1 wherein:
   the wireless access node wirelessly transferring the communication performance metric to the wireless UE comprises wirelessly transferring a Radio Resource Control (RRC) reconfiguration message to the wireless UE; and the wireless UE wirelessly receiving the communication performance metric comprises wirelessly receiving the RRC reconfiguration message.

6. The method of claim 1 wherein:

the wireless UE wirelessly transferring the service instruction comprises wirelessly transferring a Tracking Area Update (TAU) that includes the service instruction; and the network controller receiving the service instruction comprises receiving the TAU that includes the service instruction.

7. The method of claim 1 wherein the network controller responsively modifying the wireless data service for the wireless UE over the radio band comprises enabling the wireless data service for the wireless UE over the radio band or disabling the wireless data service for the wireless UE over the radio band.

8. The method of claim 1 wherein the network controller modifying the wireless data service for the wireless UE over the radio band comprises initiating a band-switch for the wireless UE from the radio band to another radio band.

9. The method of claim 1 wherein:

the wireless access node wirelessly exchanging user data with the wireless UE comprises wirelessly transferring some of the user data to the wireless UE over secondary component carriers;

the wireless UE translating the communication performance metric into the service instruction comprises translating the communication performance metric into an increase of the secondary component carriers or a decrease of the secondary component carriers; and the network controller responsively modifying the wireless data service for the wireless UE comprises increasing the secondary component carriers or decreasing the secondary component carriers over the radio band.

10. The method of claim 1 wherein:

the wireless access node wirelessly exchanging the user data, determining the communication performance metric, transferring the communication performance metric, wirelessly receiving the service instruction, and transferring the service instruction comprises at least one of a Long Term Evolution (LTE) access node and a Fifth Generation New Radio (5GNR) access node wirelessly exchanging the user data, determining the communication performance metric, transferring the communication performance metric, wirelessly receiving the service instruction, and transferring the service instruction; and the network controller receiving the service instruction and responsively modifying the wireless data service for the wireless UE comprises at least one of a Mobility Management Entity (MME) and an Access and Mobility Management Function (AMF) receiving the service instruction and responsively modifying the wireless data service for the wireless UE.

11. A wireless communication network to control a wireless data service for a wireless User Equipment (UE), the wireless communication network comprising:

a wireless access node configured to wirelessly exchange user data with the wireless UE over a radio band to deliver the wireless data service;

the wireless access node configured to determine a communication performance metric for the wireless UE over the radio band and wirelessly transfer the communication performance metric to the wireless UE;

the wireless UE configured to wirelessly receive the communication performance metric, translate the communication performance metric into a service instruction for the radio band, and wirelessly transfer the service instruction to the wireless access node;

the wireless access node configured to wirelessly receive the service instruction and transfer the service instruction to a network controller; and the network controller configured to receive the service instruction and modify the wireless data service for the wireless UE over the radio band in response to the service instruction.

12. The wireless communication network of claim 11 wherein:

the wireless access node is configured to determine a wireless data throughput for the wireless UE and determine an index based on the wireless data throughput; and the wireless UE is configured to translate the index into the service instruction.

13. The wireless communication network of claim 11 wherein:

the wireless access node is configured to determine a wireless data throughput and an error rate and for the wireless UE and determine an index based on the wireless data throughput and the error rate; and the wireless UE is configured to translate the index into the service instruction.

14. The wireless communication network of claim 11 wherein:

the wireless access node is configured to determine a wireless data throughput and a path loss and for the wireless UE and determine an index based on the wireless data throughput and the path loss; and the wireless UE is configured to translate the index into the service instruction.

15. The wireless communication network of claim 11 wherein:

the wireless access node is configured wirelessly transfer a Radio Resource Control (RRC) reconfiguration message to the wireless UE that indicates the communication performance metric; and the wireless UE is configured to wirelessly receive the RRC reconfiguration message that indicates the communication performance metric.

16. The wireless communication network of claim 11 wherein:

the wireless UE is configured to wirelessly transfer a Tracking Area Update (TAU) that includes the service instruction; and the network controller is configured to receive the TAU that includes the service instruction.

17. The wireless communication network of claim 11 wherein the network controller is configured to enable the wireless data service for the wireless UE or disable the wireless data service for the wireless UE over the radio band.

18. The wireless communication network of claim 11 wherein the network controller is configured to initiate a band-switch for the wireless UE from the radio band to another radio band.

19. The wireless communication network of claim 11 wherein:

the wireless access node is configured to wirelessly transfer some of the user data to the wireless UE over secondary component carriers;

the wireless UE is configured to translate the communication performance metric into an increase of the secondary component carriers or a decrease of the secondary component carriers; and the network controller is configured to responsively increase the secondary component carriers or decrease the secondary component carriers over the radio band.

20. The wireless communication network of claim 11 wherein:

the wireless access node comprises at least one of a Long Term Evolution (LTE) access node and a Fifth Generation New Radio (5GNR) access node; and the network controller comprises at least one of a Mobility Management Entity (MME) and an Access and Mobility Management Function (AMF).

\* \* \* \* \*